J. DOTTL AND H. G. HART.
SUPPORT.
APPLICATION FILED AUG. 2, 1919.

1,373,716.

Patented Apr. 5, 1921.

Inventor
Joseph Dottl and
Herbert G. Hart,
By Pagelsen & Spencer
Attorneys

UNITED STATES PATENT OFFICE.

JOSEPH DOTTL AND HERBERT G. HART, OF MADISON, WISCONSIN.

SUPPORT.

1,373,716.   Specification of Letters Patent.   Patented Apr. 5, 1921.

Application filed August 2, 1919. Serial No. 314,966.

*To all whom it may concern:*

Be it known that we, JOSEPH DOTTL and HERBERT G. HART, citizens of the United States, and residing at Madison, county of Dane, State of Wisconsin, have invented a new and Improved Support, of which the following is a specification.

The present invention relates to supports of the class adapted for use as pipe or conduit hangers or for holding other articles such as rods, staffs or intermediate members that in themselves merely support something else. Its aim is to provide a construction of this nature which is cheaper than ordinary devices now on the market, and which moreover possesses a desirable capacity for adjustment, so that the pipe or other supported member may be positioned in various relations to the beam or the equivalent on which it is carried.

One of the objects of the invention is to provide an improved main member whereby the device as a whole may be readily and securely clamped to the beam or other element on which it is to be carried. In the preferred construction, said main member is formed of channel cross-section to receive a key for completing the connection to the beam and also to receive a pivot for the pipe clamp proper.

Another object is to construct the pipe or tube clamp together with the connection between it and the main member in such manner that the pipe or other member to be held may extend at various angles to the beam and may be disposed close to the latter. Again, the invention provides a tube clamp arranged to swing about a vertical axis, and so shaped as to be readily formed of pressed metal.

Figure 1:
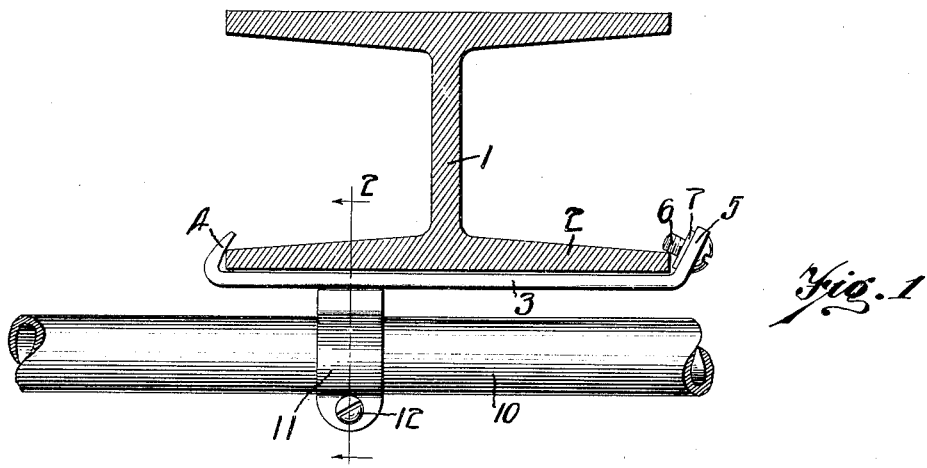
Figure 2:
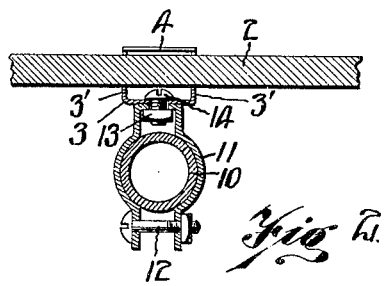
Figure 3:
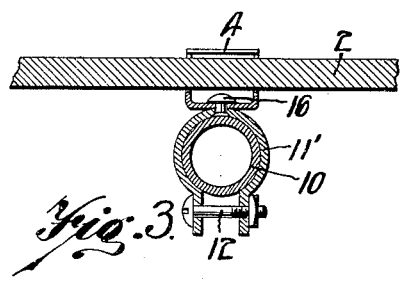
Figure 4:
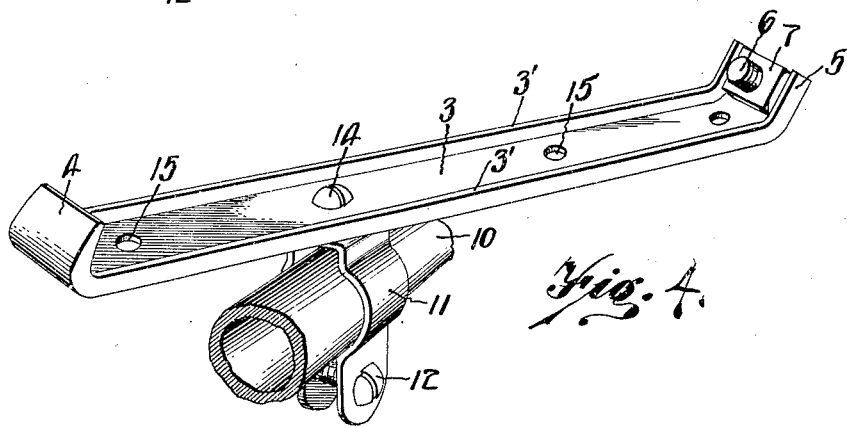

In the drawings, Figure 1 is a sectional view showing the application of the invention to an ordinary I-beam. Figs. 2 and 3 are sections on the line 2—2 of Fig. 1, Fig. 3 showing a slight modification. Fig. 4 is a perspective view of the hanger, the pipe or conduit being swung at an angle to that shown in Fig. 1.

The I-beam 1 is selected merely to indicate one type of beam or background to which the hanger or support is applicable; this beam may be replaced by other suitable elements wherein the flange 2 or its equivalent is positioned otherwise than in a horizontal plane.

In the preferred embodiment of the invention, the hanger includes a main member 3 of U-shape in cross-section (having shallow flanges 3') and terminating at one end in a hook 4 which is adapted to engage over the corresponding edge of the flange 2. At its other end, this member (together with its flanges 3') is bent up at 5 at a rather sharp angle and is pierced to permit free passage of a key, preferably in the form of a bolt or screw 6, the nut 7 of which is housed between and prevented from turning by said flanges. Obviously, the member 3 may be readily made from strap iron by a pressing operation, and when arranged crosswise of the beam 1 may be quickly and firmly secured thereto by simply screwing in on the element 6.

The device for clamping or gripping the pipe 10 or the like and securing it to the member 3 is likewise of very simple construction, being preferably formed of a strap 11, Fig. 2, or 11', Fig. 3, of sheet metal bent to conform to the pipe and having its ends pierced to receive the screw or bolt 12. At its mid-portion the strap 11 is shaped to form a housing for a nut 13 which with the screw 14 constitutes means for attaching the clamping member at any one of a series of holes 15 formed in the main member, while in Fig. 3 a rivet 16 is used for the same purpose. It will be noted that in either event the supported element 10 may be readily turned to any desired angle about the pivot screw or rivet 14—16 and that a certain amount of flexibility or capacity for angular adjustment in the various planes which include the axis of said screw or rivet is afforded, if desired, by making the construction rather loose, that is, by making the hole 15 of greater diameter than the pivot 14—16. Obviously, either connection might be drawn up tight to preclude any pivotal movement.

We are, of course, aware that the actual details of construction may be varied, but we believe that the device shown is the most desirable embodiment of the invention, all things considered.

We claim:—

A hanger including a main member secured at one end to the corresponding edge portion of a flanged beam and extending transversely across said beam, the other end of said member being of channel cross-section, a key element associated with said last named end and adapted to engage over the corresponding edge of the flange of the beam, and means for supporting a pipe or the like from said main member.

JOSEPH DOTTL.
HERBERT G. HART.